United States Patent [19]

Schafer

[11] 3,795,456

[45] Mar. 5, 1974

[54] WORM EXTRUDER WITH BUILT-ON TRANSMISSION

[75] Inventor: Heinrich Schafer, Kassel, Germany

[73] Assignee: Rheinstahl Aktiengesellschaft, Essen, Germany

[22] Filed: July 19, 1972

[21] Appl. No.: 273,132

[52] U.S. Cl. .................................. 415/72, 259/192
[51] Int. Cl. ............................................ F01d 5/00
[58] Field of Search ........................ 415/72; 259/192

[56] References Cited
UNITED STATES PATENTS 3,375,549    4/1968    Geyer ................................. 259/192
3,407,439   10/1968    Gregory .............................. 259/192

Primary Examiner—C. J. Husar
Attorney, Agent, or Firm—Walter Becker

[57] ABSTRACT

A worm extruder with built-on transmission, in which the output shaft of the transmission drives the extrusion worm which is rotatably journaled in a housing which is connected to the transmission housing through the intervention of a plate between which latter and a pressure member there is mounted a thrust bearing, said pressure member being connected for rotation either with and to the worm, or with and to the output shaft.

5 Claims, 3 Drawing Figures

WORM EXTRUDER WITH BUILT-ON TRANSMISSION

The present invention relates to a worm extruder with built-on transmission in which the stepped drive journal of the worm is non-rotatably connected to the output shaft of the transmission, which output shaft is provided with an additional axial bearing for absorbing the reaction pressure forces of the worm, and in which the worm pipe or intake housing is connected to the transmission housing preferably by screws.

With worm extruders of this type with built-on transmissions, it is known to convey the axial forces, which through a plug connection act from the extrusion worm onto the output shaft journal in the housing, through an additional shoulder of the output shaft and an additional axial tapered roller bearing onto that wall of the transmission housing which faces toward the worm.

A journaling system of this type has the drawback that the housing wall has to be made particularly thick and therefore heavy for receiving the axial forces, and that the transmission housing can be produced for only one respective bearing size for receiving the axial forces. With the bearing arrangement of the above mentioned known system, it is also disadvantageous that in view of the mounting of the axial tapered roller bearing between the bearing pair of the output shaft, that bearing of the output shaft which faces toward the worm has to be received by an additional bell whereby between the transmission housing and the worm intake housing 2 areas of partition or separating surface pairs are obtained, the connecting screws of which have to convey the full separating force.

It is, therefore, an object of the present invention with worm extruders having built-on transmissions, fully to relieve the transmission housing from the absorption of the axial forces which originate with the extrusion worm, and to make it possible that the flanged-on transmission will, with a minimum of changes, be able for different worm connections and for different bearing sizes to absorb the axial forces originating with the worm, while the number of the separating forces in which reaction forces of the same size are to be transferred will be reduced.

These and other objects and advantages of the invention will appear more clearly from the following specification, in connection with the accompanying drawings, in which.

The worm extruder with built-on transmission according to the invention in which the stepped driving journal of the worm is firmly connected to the output shaft of the transmission for rotation therewith, said output shaft being provided with an additional axial bearing for receiving the worm reaction force while the worm pipe is connected to the transmission housing, is characterized primarily in that the axial force of the worm acting in the direction toward the transmission is adapted through a pressure member non-rotatably connected to the transmission output shaft to be conveyed to an axial roller bearing and from there onto an intermediate plate which is connected to the intake housing as well as to the transmission housing. For those instances of employment in which the diameter of the drive journal of the worm corresponds approximately to the diameter of the output shaft of the transmission, it is provided according to the invention that for turning the driving journal of the worm, the pressure member which is non-rotatably and non-displaceably mounted on the transmission shaft is at that end which is adjacent to the worm on the inside provided with splined teeth or another corresponding tooth system.

In those instances of employment in which the diameter of the drive journal of the worm is shorter than the diameter of the output shaft of the transmission, it is provided that for turning the drive journal of the worm, that end of the transmission shaft which is adjacent to the worm is on its inside provided with splined teeth or another suitable tooth system.

Figure 1:
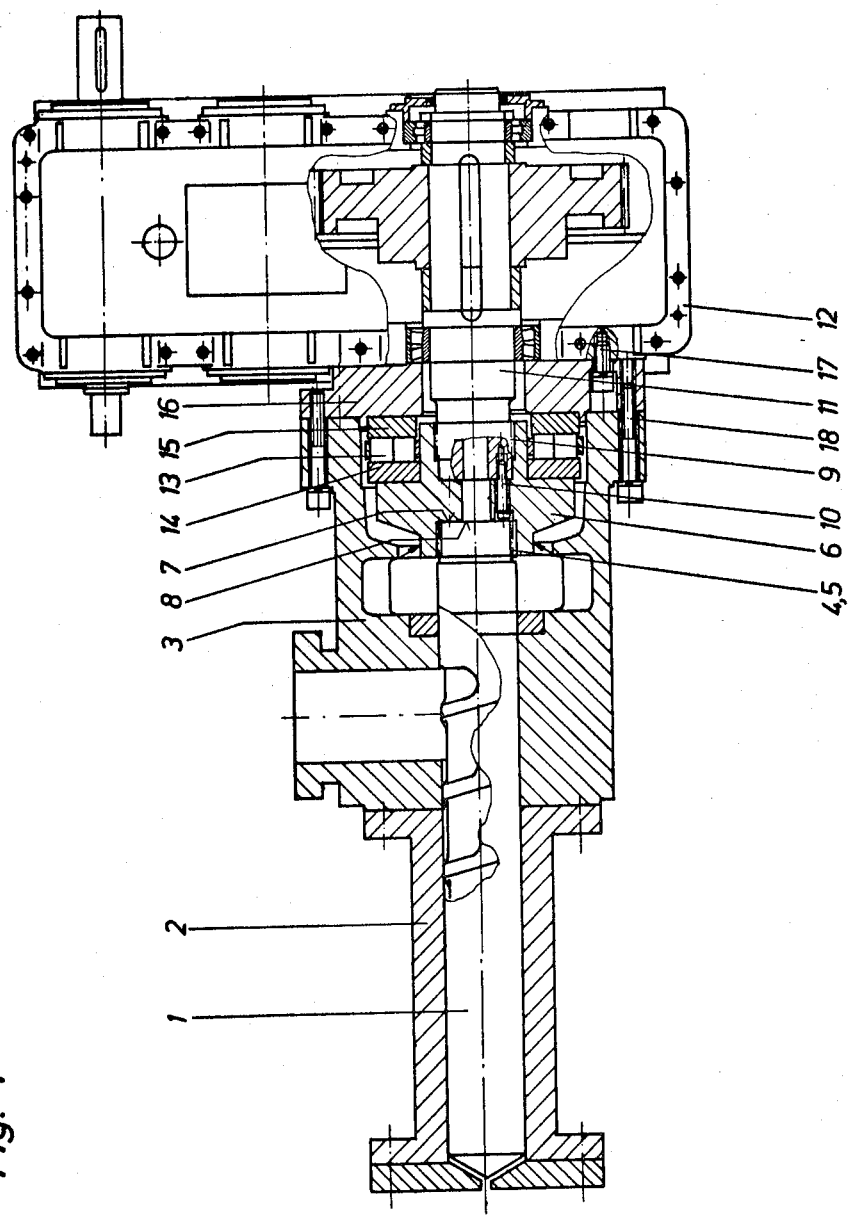
FIG. 1 is a longitudinal section through a worm extruder with built-on transmission designed in conformity with the present invention.

Referring now to the drawings in detail, FIG. 1 shows the worm 1 guided in the worm tube 2 and the take-in housing 3. On that end 4 of the worm 1 which is adjacent to the transmission there is on the outside of the worm 1 provided a splined or other suitable tooth system which extends in the correspondingly shaped profile 5 of the pressure member 6. The end face 7 of the worm 1 engages the oppositely located shoulder 8 of the pressure member 6. The pressure member 6 is, through a splined tooth system, or the like, 9, and by means of screws 10, non-rotatably and non-displaceably connected to the output shaft 11 of the transmission 12. the axial roller bearing 13 is, with its shaft disc 14, mounted on the pressure member 6. The housing disc 15 of the axial roller bearing is, by means of an outer centering arrangement, centered in the intermediate plate 16. The intermediate plate 16 is connected to the housing of transmission 12 by means of screws 17. The intake housing 3 is connected with intermediate plate 16 by means of screws 18.

In view of the arrangement of the axial roller bearing 13 according to FIG. 1, the transmission is completely relieved from the reaction pressure force of the worm. The reaction pressure force of the worm is with this arrangement returned to the intake housing and the worm tube so that a closed circuit for the forces is established.

Figure 2:
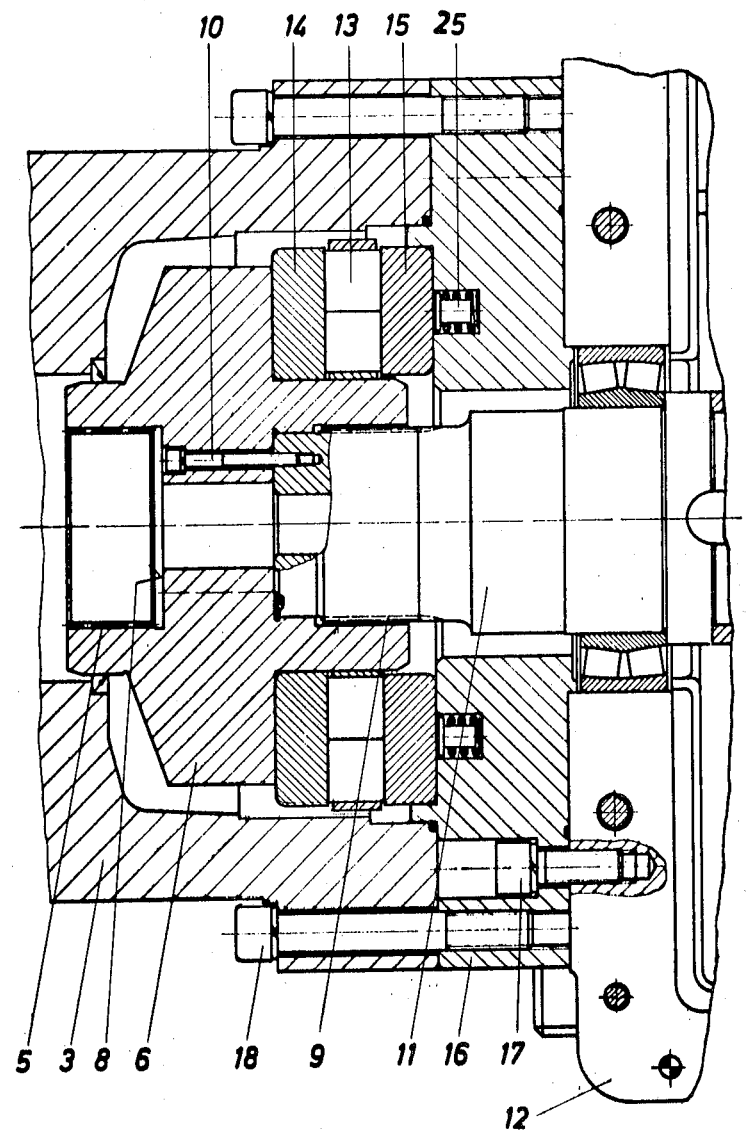
FIG. 2 illustrates on a considerably larger scale than that of FIG. 1 the installation of the axial bearing for the worm reaction pressure while the worm is turned through a pressure member for receiving the worm reaction pressure.

FIG. 2 shows the arrangement of the axial roller bearing of FIG. 1 on an enlarged scale. By means of spring-loaded bolt member 25 inserted in the intermediate plate 16, the axial roller bearing is held under a low axial preload during conditions of operation with which no axial forces occur. That end of the worm which is adjacent to the transmission and is not shown in FIG. 2 will, during operation, rest against the inner shoulder 8 of the pressure member 6.

Figure 3:
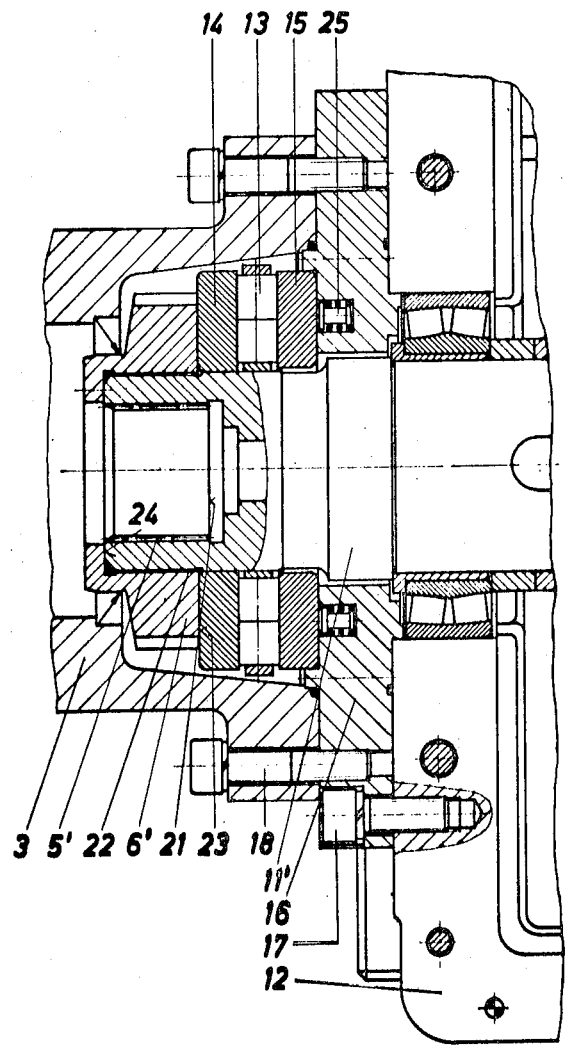
FIG. 3 is a section similar to that of FIG. 2, but differs therefrom in that the worm is turned directly by the transmission output shaft.

The arrangement of the axial roller bearing according to FIG. 3 corresponds substantially to the arrangement of FIG. 2. The primary difference between FIG. 3 and FIG. 2 consists in that according to FIG. 3 the rotation of the worm (not illustrated in FIG. 3) is effected by a splined tooth system provided in the shaft end of the output shaft 11'. The worm engages the surface 21 of the output shaft 11'. The pressure member 6' is, by means of a thread 22, connected to the output shaft 11' while the thread pitch is selected opposite to the rotation of operation of the worm in order to prevent the pressure member 6' from becoming loose during the operation. A plate engagement of the shaft disc of the axial bearing will be assured by the fact that the engaging surface 23 and the collar surface 24 of the pressure member 6' are machined in one single setting.

As will be seen from the above, the main advantages realized by the present invention consist primarily in that with worm extruders with built-on transmission, the transmission is fully relieved from axial forces in view of the connection with an axial roller bearing outside the transmission and by the employment of an intermediate plate while, considering transmission of the same magnitude, it is possible without any particular expenses merely by changes on the transmission output shaft and by exchanging the intermediate plate and the pressure members to employ axial bearings of different sizes and different connections to the worms.

It is, of course, to be understood that the present invention is, by no means, limited to the particular showing in the drawings, but also comprises any modifications within the scope of the appended claims.

What I claim is:

1. A worm extruder which includes in combination: housing means having an extrusion opening, a worm rotatably journaled in said housing means, a pressure member having an opening in axial alignment with said worm and being arranged at that end of said worm which is remote from said extrusion opening, said pressure member being rotatably connected to said worm for rotating the latter, plate means having a passage therethrough in substantially axial alignment with said worm and being arranged in axially spaced relationship to said pressure member, means connecting said plate means directly to said housing means for axial pressure bearing engagement so that drive construction remains free of return pressure forces of said worm, antifriction thrust bearing means interposed between said pressure member and said plate means, transmission means connected to said plate means and including an output shaft drivingly connected to said pressure member for driving the latter and thereby said worm whereby the axial reaction force of said worm during operation thereof is conveyed back to said housing means through said pressure member and said thrust bearing means and said plate means.

2. A worm extruder in combination according to claim 1, in which said output shaft is in axial alignment with said worm.

3. A worm extruder in combination according to claim 1, in which said pressure member has that portion thereof which is connected to said worm for rotating the latter provided with splined teeth meshing with a splined section of said worm.

4. A worm extruder in combination according to claim 1, in which said pressure member has that portion thereof which is drivingly connected to said output shaft provided with splined teeth engaging a correspondingly splined portion of said output shaft.

5. A worm extruder which includes in combination: housing means having an extrusion opening, a worm rotatably journaled in said housing means and having a splined section at that end portion thereof which is remote from said extrusion opening, a pressure member having an opening in axial alignment with said worm and being arranged at that end of said worm which is remote from said extrusion opening, plate means having a passage therethrough in substantially axial alignment with said worm and being arranged in axially spaced relationship to said pressure member, means connecting said plate means directly to said housing means, antifriction thrust bearing means interposed directly between said pressure member and said plate means, and transmission means connected to said plate means and including an output shaft having a hollow end provided with inner splined teeth meshing with and receiving said splined section of said worm, the outer periphery of said hollow end of said output shaft having said pressure member connected thereto for rotation with said output shaft whereby the axial reaction force of said worm during operation thereof is conveyed back only to said housing means through said pressure member and said bearing means and said plate means.

* * * * *

UNITED STATES PATENT OFFICE
CERTIFICATE OF CORRECTION

Patent No. 3,795,456        Dated  March 5, 1974

Inventor(s)  Heinrich Schafer

It is certified that error appears in the above-identified patent and that said Letters Patent are hereby corrected as shown below:

On the cover sheet insert

-- Foreign application priority data

July 20, 1972    Germany  P21 36 174.0 --.

Signed and sealed this 24th day of September 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,795,456            Dated March 5, 1974

Inventor(s) Heinrich Schafer

It is certified that error appears in the above-identified patent and that said Letters Patent are hereby corrected as shown below:

On the cover sheet insert:

-- [30] Foreign application priority data

July 20, 1971      Germany P21 36 174.0 --.

This certificate supersedes Certificate of Correction issued Sept. 24, 1974.

Signed and sealed this 11th day of February 1975.

(SEAL)
Attest:

RUTH C. MASON
Attesting Officer

C. MARSHALL DANN
Commissioner of Patents
and Trademarks